(12) United States Patent
Huat

(10) Patent No.: US 7,289,560 B2
(45) Date of Patent: Oct. 30, 2007

(54) DIGITAL MODULATION AND DEMODULATION TECHNIQUE FOR RELIABLE WIRELESS (BOTH RF AND IR) AND WIRED HIGH BANDWIDTH DATA TRANSMISSION

(75) Inventor: Chua Beng Huat, Singapore (SG)

(73) Assignee: FreeSystems Pte. Ltd., Singapore (SG)

( * ) Notice: Subject to any disclaimer, the term of this patent is extended or adjusted under 35 U.S.C. 154(b) by 689 days.

(21) Appl. No.: 10/346,383

(22) Filed: Jan. 17, 2003

(65) Prior Publication Data

US 2004/0141568 A1    Jul. 22, 2004

(51) Int. Cl.
    *H03K 7/04* (2006.01)
(52) U.S. Cl. ...................................................... 375/239
(58) Field of Classification Search ................ 375/237, 375/238, 239, 241, 242, 286, 342, 353, 359, 375/361; 332/106–116; 341/50–107, 177–184; 455/23, 42, 108
See application file for complete search history.

(56) References Cited

U.S. PATENT DOCUMENTS

| | | | |
|---|---|---|---|
| 3,924,080 A | 12/1975 | Caldwell | |
| 4,712,217 A | 12/1987 | McPherson | |
| 5,267,269 A * | 11/1993 | Shih et al. | 375/296 |
| 5,394,410 A | 2/1995 | Chen | 371/70 |
| 5,761,243 A | 6/1998 | Russell et al. | 375/233 |
| 5,892,796 A | 4/1999 | Rypinski | 375/232 |
| 6,118,567 A | 9/2000 | Alameh et al. | 359/189 |
| 6,169,765 B1 | 1/2001 | Holcombe | 375/238 |

FOREIGN PATENT DOCUMENTS

| | | |
|---|---|---|
| EP | 977382 A | 9/2003 |
| WO | WO 96/29800 | 9/1996 |
| WO | WO 9637977 | 11/1996 |

OTHER PUBLICATIONS

Lerenshtein, "Efficient Reconstruction of Sequences", IEEE Trans. on Information, vol. 47, No. 1, Jan. 2001, pp. 2-22.

(Continued)

*Primary Examiner*—David C. Payne
*Assistant Examiner*—Aslan Ettehadieh
(74) *Attorney, Agent, or Firm*—Saile Ackerman LLC; Stephen B. Ackerman; Billy Knowles

(57) ABSTRACT

A communication system compensates pulse positioned modulated data signals for channel induced intersymbol interference and extracts pulse positioned encoded data from a received signal corrupted with the channel induced intersymbol interference. The communication system has a transmitter and a receiver. The transmitter includes a modulation apparatus that has a symbol mapping circuit, which receives data symbols to be transmitted and maps the data symbols to a transmission code. The receiver has a demodulation apparatus to recover data symbols in the presence of the channel induced intersymbol interference. The demodulation apparatus has a sampling circuit in communication with a signal receiving circuit within the receiver to sample at a regular period received data symbols acquired by the receiving circuit. The samples of the data samples are retained by a sample retaining circuit in communication with the sampling circuit. The sample retaining circuit transfers the retained samples to a symbol mapping circuit. The symbol mapping circuit then recovers the data symbols.

23 Claims, 14 Drawing Sheets

OTHER PUBLICATIONS

Wornell, "Spread-Response Precoding for Communiation Over Fading Channels," IEEE Trans. on Information Theory, vol. 42, No. 2, Mar. 1996, pp. 488-501.

Jiang et al., "Linear Complexity of a Sequence Obtained from a Periodic Sequence by Either Substituting ,Inserting,or Deleting k Symbols Within One Period," IEEE Trans. on Information Theory, vol. 46, No. 3, May 2000, pp. 1174-1177.

Georghiades, "On the Synchronizability and Detectability of Random PPM Sequences," IEEE Trans. on Info. Theory,vol. 35,No. 1, Jan. 1989, pp. 146-156.

"Multistage Block- Spreading for Impulse Radio Multiple Access Through ISI Channels", by Liuqing Yang et al. IEEE Jrnl. on Selected Areas in Communications, IEEE Service Center, Piscataway, U.S., vol. 20, No. 9, Dec. 2002, XP011065566, ISSN: 0733-8716, pp. 1767-1777.

* cited by examiner

DIGITAL MODULATION AND DEMODULATION TECHNIQUE FOR RELIABLE WIRELESS (BOTH RF AND IR) AND WIRED HIGH BANDWIDTH DATA TRANSMISSION

BACKGROUND OF THE INVENTION

1. Field of the Invention

This invention relates to transmission and reception of signals. More particularly, this invention relates to the encoding and modulation of transmission signals with digital data and the demodulation and decoding of received signals corrupted by channel induced intersymbol interference.

2. Description of Related Art

In the transmission and reception of digital data, channel induced intersymbol interference is the arrival of multiple copies of a transmitted signal that causes the information from one segment of information to corrupt a subsequent segment of information. The multiple copies of the transmitted signals occur generally because of reflections of the transmitted signals within the environment.

The level of the reflection determines the level of degradation of the signal received and the probability of the intersymbol interference causing errors in the reception of the signals. Also, the amount of time required for the reflections to transit from the transmitter to the reflection point and thence to the receiver further determines the quantity of intersymbol interference.

Refer now to FIG. 1 for a discussion of channel induced intersymbol interference in a wireless radio frequency (RF) transmission. In this instance the transmitter 5 is connected to the antenna 10, which radiates an RF signal. Even though the RF signal emanates from the antenna 10 as a contiguous wavefront, it is shown as three separate wavefronts 35, 40, and 50. The wavefront 35 is travels through the atmosphere in a direct path. The wavefront 40 travels through the atmosphere and is reflected from a landmass 30 such as mountains and hills. The reflected wavefront 45 then arrives at the antenna 15. The wavefront 50 travels through the atmosphere and is reflected by buildings 25 of a metropolitan area. The reflected wavefront 55, likewise, then arrives at the antenna 15.

The antenna 15 is connected to the receiver 20. The receiver acquires the transmitted signal and recovers the information modulated within the RF signal. It is apparent that the wavefront 35 travels the most direct route from the transmitting antenna 10 to the receiving antenna 15. The reflected wavefronts 45 and 55, on the other hand, arrive at the antenna 15 at some time later than the wavefront 35. If the amplitude of the reflected wavefronts is larger than the environmental noise, the receiver will acquire the reflected wavefronts 45 and 55 and be indistinguishable from the wavefront 35, except that they will be delayed in time.

Refer now to FIG. 2 for a discussion of the channel induced intersymbol interference within a wireless RF data communication system. The digital data 105 and its synchronizing clock 100 is the input signal to the transmitter 5 of FIG. 1. A common method of modulating the RF signal with the digital data 105 is frequency shift keying (FSK) In frequency shift keying, the voltage level of the digital data representing a digit having a binary 0 causes the RF signal to have a first frequency $f_0$ 135 and the digit having a binary 1 causes the RF signal to have a second frequency $f_1$ 140.

The transmitter 5 transmits the RF signal 110 from the antenna 10 as described above. The RF signal transits the multiple paths as described with each signal being delayed in time. The direct RF signal $\lambda_1$ 115 arrives at the antenna after a delay $\delta_1$ 145. The reflected RF signal $\lambda_2$ 120 arrives at the antenna after a delay $\delta_2$ 150. The reflected RF signal $\lambda_3$ 125 arrives at the antenna after a delay $\delta_3$ 155.

The direct RF signal $\lambda_1$ 115 and the reflected RF signals $\lambda_2$ 120 and $\lambda_3$ 125 are superimposed upon each other at the antenna and transferred to the receiver 20. The receiver 20 employs superheterodyne techniques to extract the digital data from the differences in frequency that defines the digital data. The data message 130 should change from the binary zero to the binary 1 at the time 170. However, the delayed reflected signals $\lambda_2$ 120 and $\lambda_3$ 125 interfere with the direct received signal 115 and cause an uncertainty 160 of the digital data. The digital data may remain at the binary 0 and is not definitely changed until the time 175. The magnitude of the delayed reflected signals $\lambda_2$ 120 and $\lambda_3$ 125 determines the impact of this intersymbol interference. Similarly, the data message 130 should change from the binary 1 to the binary 0 at the time 10, however, the interference from the delayed reflected signals $\lambda_2$ 120 and $\lambda_3$ 125 might cause the data message 130 to remain at the binary 1 until the time 185. This uncertainty time 165 may cause a misinterpretation of the digital data.

Similar channel induced intersymbol interference can occur in wireless infrared light transmission as illustrated in FIG. 3. In this case the transmitter 205 and the receiver 220 are generally enclosed within a room 200. The transmitter 205 excites the light emitting diode (LED) to emit infrared light. A typical type of transmission is on-off-keying (OOK), where the LED is excited for data having a binary one and turned off for data having a binary zero. The light is transmitted to a photodiode 215. The photodiode 215 is connected to the receiver 220, which recovers the received light signal and demodulates the received signal to extract the transmitted information.

The light signal as transmitted from the LED 210 is a contiguous wavefront, but for illustration it is shown as three separate wavefronts 235, 240, and 250. The wavefront 235 represents the portion of the light signal that travels directly to the photodiode 215. The wavefronts 240 and 250 are transmitted toward the sidewalls of the room 200 and the wavefronts 246 and 255 are reflected to the sidewalls to the photodiode 215. The reflected wavefronts 246 and 255 travel a longer distance through the room 200 to arrive at the photodiode 215 and thus interfere with the wavefront 235 that arrive earlier.

Referring to FIG. 4 for a discussion of the modulation of the light signal as transmitted from the transmitter 205 of FIG. 3. The data clock 300 has the frequency rate that the digital data message is gated within the transmitter 210. The modulation clock (PPM CLK 305) that is used to generate the four-pulse position modulated signal of the transmitted signal 310. Each time slot t1, t2, t3, t4 is divided into four sub-increments $s_1$, $s_2$, $s_3$, $s_4$. One sub-increment $s_1$, $s_2$, $s_3$, or $s_4$ is set to a binary one, in this representation, to represent a two digit binary number. Since only one sub-segment may be occupied for any one time slot t1, t2, t3, t4, the coding can only represent the four possible combinations of the two digit binary numbers. The four-pulse position modulated signal of the data message illustrates the modulation of the four possible binary digit combinations of the dual-bit data and is explained as follows:

| Time Slot | Dual-Bit Code | PPM Encoding |
|-----------|---------------|--------------|
| t1 | 00 | 1000 |
| t2 | 01 | 0100 |
| t3 | 10 | 0010 |
| t4 | 11 | 0001 |

The pulse positioned modulated signal 310 is transmitted by activation of the LED 210. The direct light signal $\lambda_1$ 320 arrives at the photodiode 215 after a delay $\delta_1$ 340. The reflected light signal $\lambda_2$ 325 arrives at the photodiode 215 after a delay $\delta_2$ 345. The reflected light signal $\lambda_3$ 330 arrives at the photodiode 215 after a delay $\delta_3$ 350.

The direct light signal $\lambda_1$ 320 and the reflected light signals $\lambda_2$ 325 and $\lambda_3$ 330 are superimposed upon each other at the photodiode 215 and transferred to the receiver 220. The receiver 220 recovers the pulse positioned data message 335. The pulse positioned data 335 changes from the voltage level of the binary zero to the voltage level of the binary one after the delay $\delta_1$ 340. However, the delay $\delta_2$ 345 and $\delta_3$ 350 of the reflected signals $\lambda_2$ 325 and $\lambda_3$ 330 causes the photodiode to detect the binary one for a time longer than the length of a sub-increment $s_1$, $s_2$, $s_3$, $s_4$ of a time slot t1, t2, t3, or t4. The magnitude of the reflection maybe insufficient to consistently determine this uncertainty time 355. Further, if two symbols such as a 11 followed by a 00 are transmitted the detection of the binary one extending beyond the sub-increment $s_1$, $s_2$, $s_3$, $s_4$ of a time slot t1, t2, t3, or t4 now interferes with a subsequent symbol. The severity of the channel induced intersymbol interference prevents the extension of the bandwidth of communication system beyond the ability of the communication to reliably detect and recover the received data message.

U.S. Pat. No. 6,169,765 (Holcombe) describes an output signal pulse width error correction circuit and method wherein errors in a data signal conforming to a communications protocol having a prescribed duty cycle are corrected by monitoring a duty cycle of the data signal, comparing the duty cycle to a duty cycle reference voltage corresponding to the prescribed duty cycle, and adjusting a pulse width of the data signal to conform to the prescribed duty cycle of the protocol.

U.S. Pat. No. 5,394,410 (Chen) explains a technique for encoding data for serial transmission and the correlative technique for decoding the transmitted data.

U.S. Pat. No. 5,892,796 (Rypinski) illustrates frame format and method for adaptive equalization within an integrated services wireless local area network to prevent fading and intersymbol interference due multiple path radio propagation.

U.S. Pat. No. 6,118,567 (Alameh, et al.) teaches a waveform encoding method and device provide for generating/receiving a power efficient binary intensity modulated optical data signal from a binary source signal which minimizes a time between adjacent pulse transitions and maximizes a pulse peak amplitude for transmission over a low-power wireless infrared link "Efficient Reconstruction of Sequences," Levenshtein, et al., IEEE Transactions on Information Theory, January 2001, Volume: 47, Issue: 1, pp. 2-22 introduces and provides solutions for problems of efficient reconstruction of an unknown sequence from its versions distorted by errors of a certain type.

"Spread-Response Precoding for Communication Over Fading Channels," Wornell, IEEE Transactions on Information Theory, March 1996, Volume: 42, Issue: 2, pp. 488-501 presents "spread-response precoding" to effectively transform an arbitrary Rayleigh fading channel into a nonfading, simple white marginally Gaussian noise channel.

"Linear Complexity Of A Sequence Obtained From A Periodic Sequence By Either Substituting, Inserting, Or Deleting K Symbols Within One Period," Jiang et al., IEEE Transactions on Information Theory, May 2000, Volume: 46, Issue: 3, pp. 1174-1177 provides a unified derivation of the bounds of the linear complexity for a sequence obtained from a periodic sequence over GF(q) by either substituting, inserting, or deleting k symbols within one period.

"On The Synchronizability And Detectability Of Random PPM Sequences," Georghiades, IEEE Transactions on Information Theory, January 1989, Volume: 35, Issue: 1, pp. 146-156, investigates the problem of synchronization and detection of random pulse-position modulation (PPM) sequences under the assumption of perfect slot synchronization. Bounds on the symbol error probability and the probability of false synchronization that indicate the existence of a severe performance floor are derived. A way to eliminate the performance floor is suggested by inserting 'special' PPM symbols in the random data stream.

SUMMARY OF THE INVENTION

An object of this invention is to provide a communication system where pulse positioned modulated data signals is compensated for channel induced intersymbol interference.

An object of this invention is to extract pulse positioned encoded data from a received signal corrupted with channel induced intersymbol interference.

To accomplish at least one of these objects and other objects a communication system has a transmitter and a receiver. The transmitter transmits a signal containing pulse positioned modulated and compensated data symbols The receiver acquires the signal containing the pulse positioned modulated data symbols, recovers the data symbols, and extracts the data.

The transmitter includes a modulation apparatus connected to receive data and convert the data to pulse positioned modulated data symbols, the pulse positioned modulated data symbols encoded to compensate for the channel induced intersymbol interference The modulation apparatus has a symbol mapping circuit, which receives data symbols to be transmitted and maps the data symbols to a transmission code. The modulation apparatus compares two adjacent data symbol digits, if the two adjacent data symbol digits have a first data level, the data symbol digits are transmitted. If the first digits of the data symbol digits has a first data level and a second digit of the data symbol digits has a second data level, the data symbols are also transmitted. However, if the first and second data symbol digits have a second data level, transmitting a first of the two adjacent data symbol digits is transmitted, a second of the two adjacent data symbol digits is converted to the first data level and the second data symbol digits is then transmitted.

The receiver has a demodulation apparatus to recover data symbols in the presence of the channel induced intersymbol interference. The demodulation apparatus has a sampling circuit in communication with a signal receiving circuit within the receiver to sample at a regular period received data symbols acquired by the receiving circuit. The samples of the data samples are retained by a sample retaining circuit in communication with the sampling circuit. The sample retaining circuit transfers the retained samples to a symbol mapping circuit. The symbol mapping circuit then recovers the data symbols.

The symbol mapping circuit executes a method for recovering the data symbols by first determining from two adjacent data symbol digits if a first state transition is present in the data symbol digits. The first state transition indicates that a first of the two adjacent data symbol digits is at the first data level and a second of the two adjacent data symbol digits is the second data level. If the first state transition is present, a first state transition time is recorded. If the first state transition is not present the search to determine the first state transition continues until it is present.

When the first state transition is determined, a second state transition is determined to be present in the data symbol digits The second state transition indicates that a first of the two adjacent data symbol digits is at the second data level and the first of the two adjacent data symbol digits is the second data level. When the second state transition is present, a second state transition time is recorded. The time difference between the first state transition time and the second state transition time is then calculated. If the time difference is less than a boundary time, at least one of any data symbol digits received subsequently to the second data symbol digit of the two adjacent symbol digits having the first state transitions is set to the first data level. If the time difference is greater than the boundary time, a first data symbol digit received subsequently to the second data symbol digit of the two adjacent symbol digits having the first state transition is set to the first data level and a second data symbol digit to the second data level.

All data symbol digits received subsequent to the second data symbol digit of the two adjacent symbol digits having the first state transition and prior to a data symbol boundary are set to the first data level. The data symbol digit arriving subsequent to the data symbol boundary to a second data level and all remaining symbol digits of one data symbol subsequent to the data symbol boundary are set to the first data level.

The method for recovering the data symbols continues by determining if a last data symbol digit of a symbol is at the second data level. If the last data symbol digit is at the second data level, all symbol digits of a following data symbol are determined if they are at the first data level. If all the data symbol digits of the following data symbol are at the first data level, the first symbol digit of the following data symbol is set to the second data level.

DETAILED DESCRIPTION OF THE INVENTION

The intersymbol interference as described above limits the frequency spectrum usable for the transfer of digital data. The transfer of long strings of zeros and ones or heavy toggling between zeros and ones causes corruption of the digital data due to the multipath effects that induce the intersymbol interference described. The use of pulse positioned modulation provides a relatively low switching rate. Once the receiving system is synchronized to the received signal, the recovery of the data is more reliable since the errors that occur are not position dependent and do not propagate. Certain symbol arrangements however, do cause limitation of the frequency due to the multipath effects that can create intersymbol interference. In symbol combinations (11) followed by (00), and (10) followed by a (00) of a four pulse position modulated encoded data, the intersymbol interference is sufficient to potentially corrupt the received data and make the transmitted data not recoverable. The method and system of this invention employs a recoding of the pulse positioned modulation to compensate for the symbol combinations (11) followed by a (00). The symbols combinations (10) followed by a (00) are determined as a result of the patterns detected.

Figure 5:
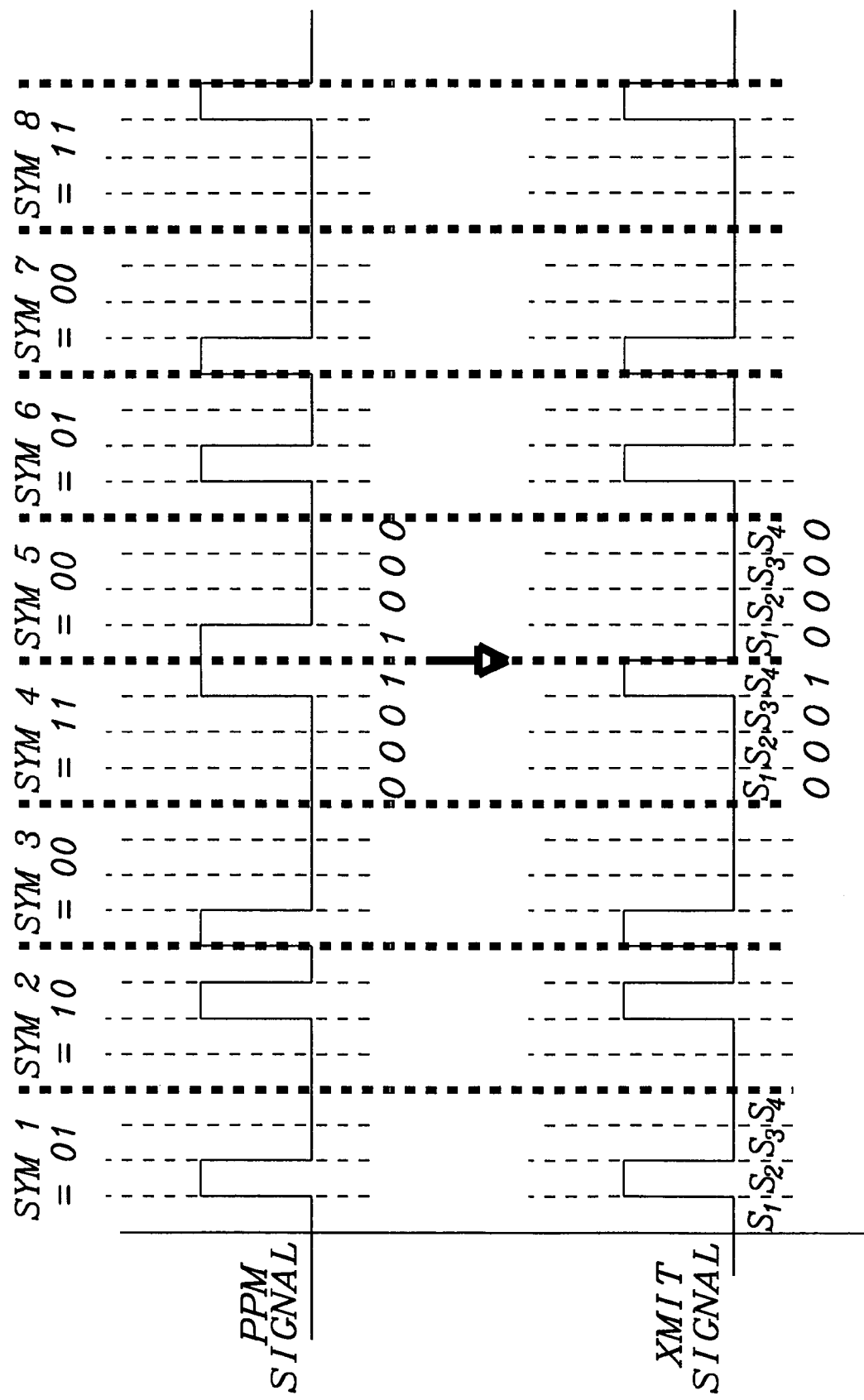
FIG. 5 is a plot of a stream of pulse positioned modulated symbols being mapped to compensate for intersymbol interference of this invention.

Refer now to FIG. 5 for a more detailed discussion of the recoding of the pulse positioned modulation to create a signal which then modulates the transmitted signal (either radio frequency or light signals). The PPM signal shows the digital data (0110001100010011) and formed partitioned to form the symbols SYM 1, . . . , SYM 8. The symbols SYM 2 and SYM 3 contain the symbols 10 and 00 that are the first of the potential intersymbol interference candidates. The symbols SYM 4 and SYM 5 contain the symbols 11 and 00 that are the second of the potential intersymbol interference candidates.

Figure 4:
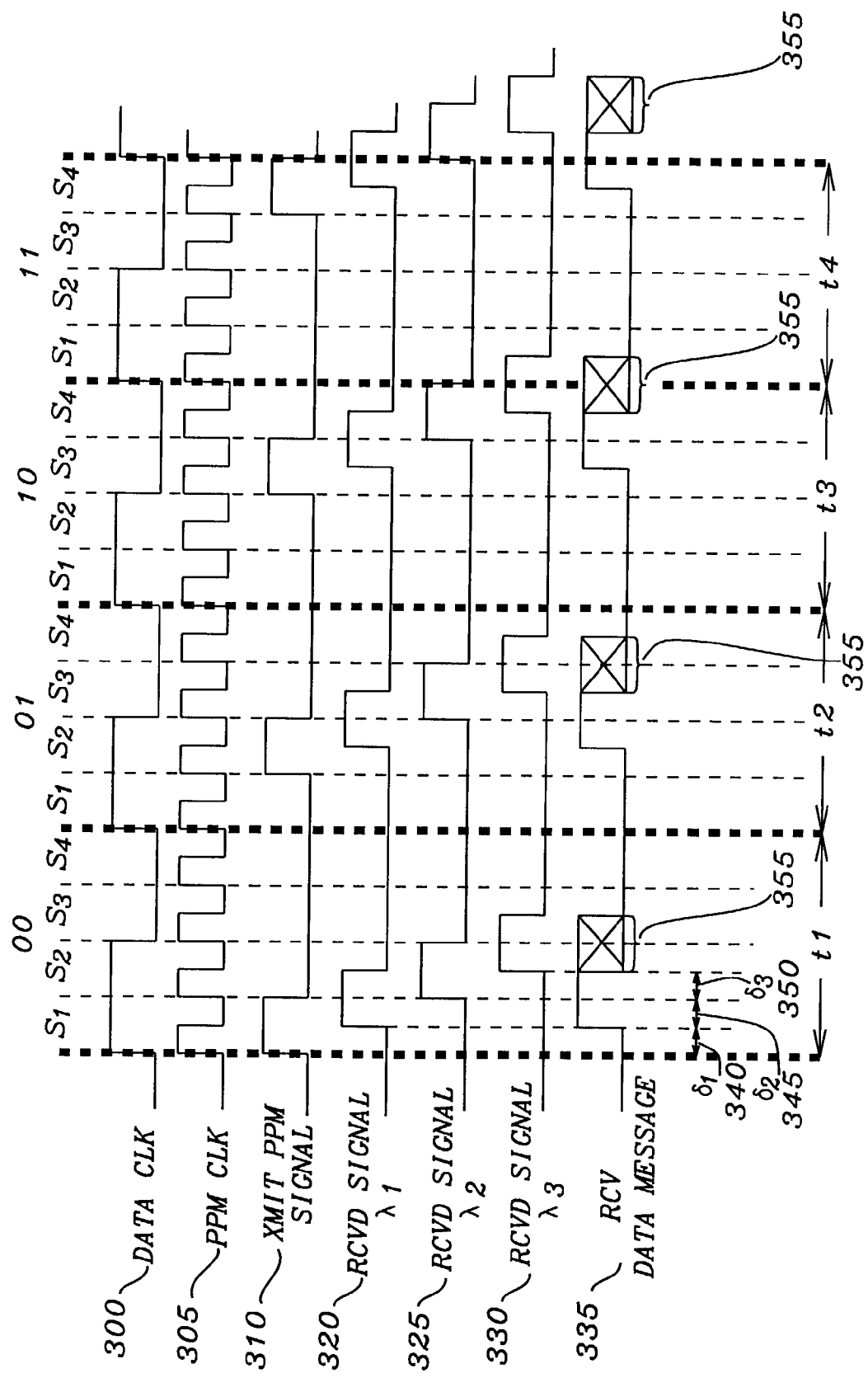
FIG. 4 is a timing diagram illustrating the effects of channel induced intersymbol interference on received digital data in wireless infrared channel of the prior art.

In the case of the four pulse position modulation, as described in FIG. 4, each symbol is divided into four different times slots $s_1$, $s_2$, $s_3$, and $s_4$. Each time slot represents a digit of the symbol and only one of the four different times slots $s_1$, $s_2$, $s_3$, and $s_4$ may contain the voltage level representative of the binary one. The intersymbol interference for the symbols SYM 4 and SYM 5 is compensated by placing the symbol digit $s_1$ from a binary one for SYM 5 to a binary zero for the transmission signal. This is an illegal character for the digital data and can be corrected at the receiver as describe hereinafter. Thus all symbols having a data pattern as shown for symbols SYM 4 and SYM 5 are recoded or mapped to the format of the transmit signal (XMIT SIGNAL), where the symbols SYM 4 and SYM 5 are now coded as (0001), (0000).

Figure 1:
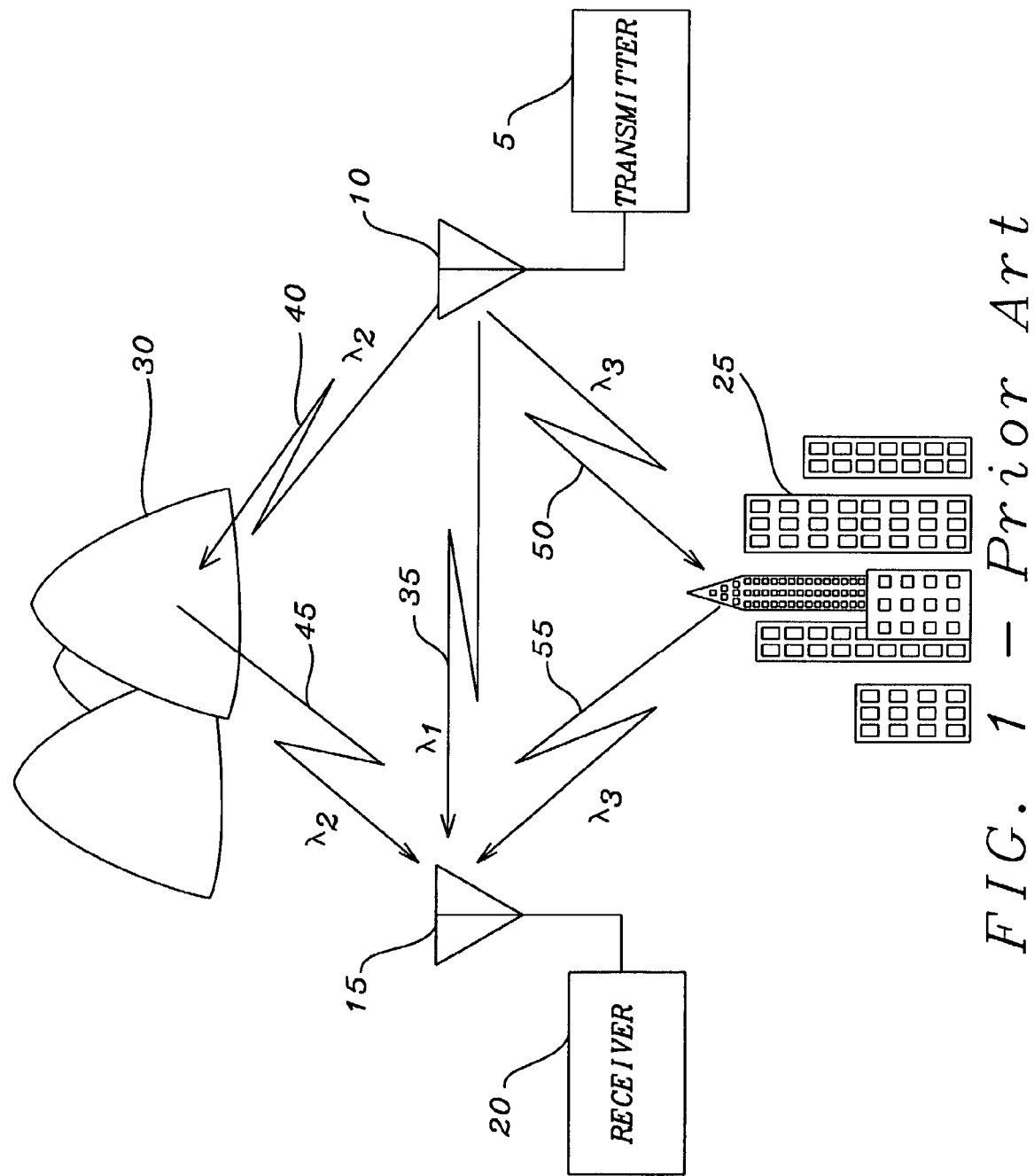
FIG. 1 is a diagram of the operation of a wireless radio transmitter and receiver illustrating channel induced interference of the prior art.
Figure 2:
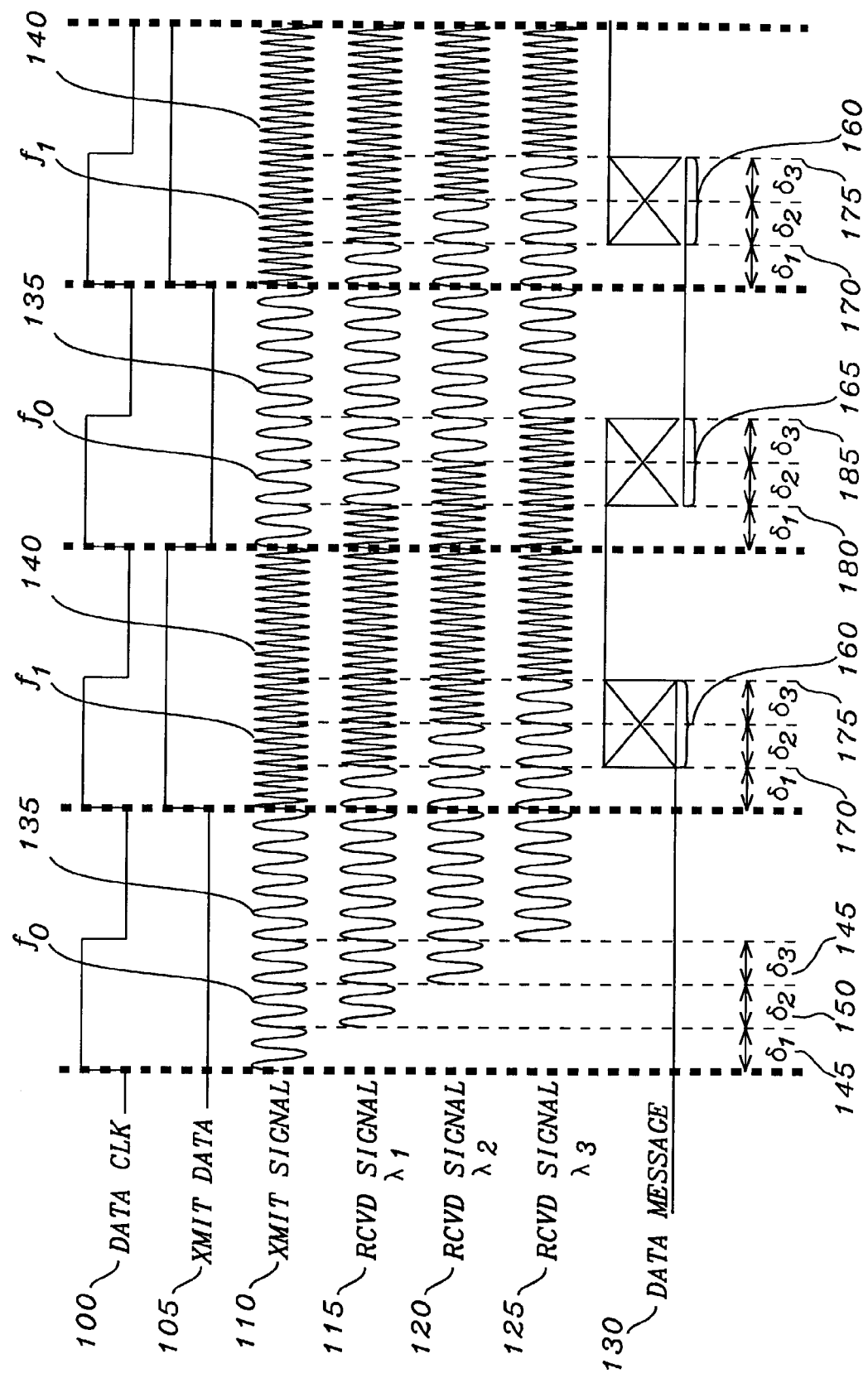
FIG. 2 is a timing diagram illustrating the effects of channel induced intersymbol interference on received digital data in wireless radio frequency channel of the prior art.
Figure 6:
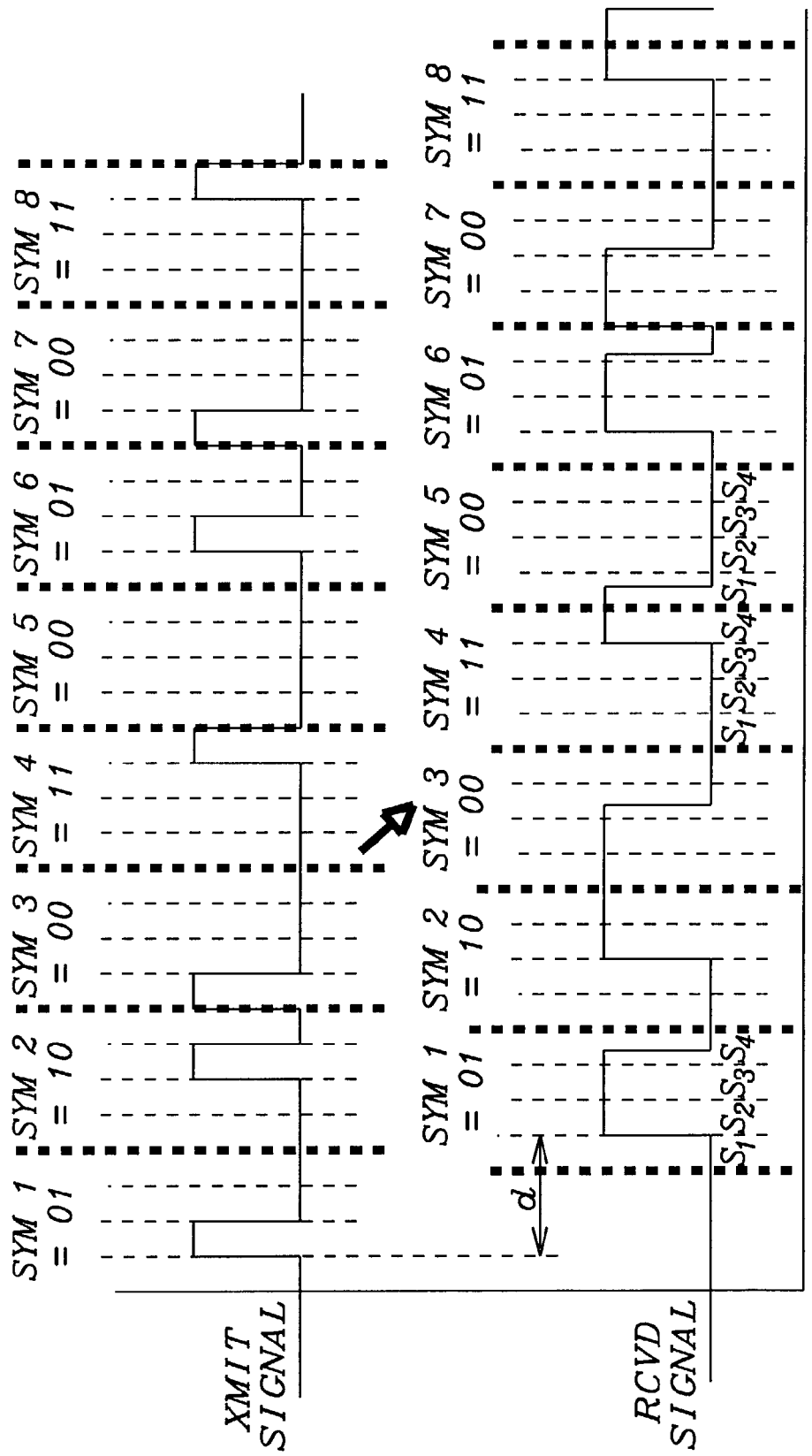
FIG. 6 is a plot of a stream of pulse positioned modulated symbols transmitted and received demonstrating intersymbol interference of this invention.

Referring to FIG. 6, the transmit signal (XMIT SIGNAL) modulates a wireless RF signal as described in FIG. 2 or a light signal as described in FIG. 4 for broadcast. The wireless RF or light signal is acquired at the receiver. The receiver amplifies wireless RF or light signal and recovers the received signal. The received signal is delayed as described in FIGS. 1 and 3 from the transmitted signal by a delay δ. However, the reflected signals $\lambda_2$ and $\lambda_3$ of FIGS. 1 and 3 delayed and are superpositioned on the direct signal $\lambda_1$.

Figure 3:
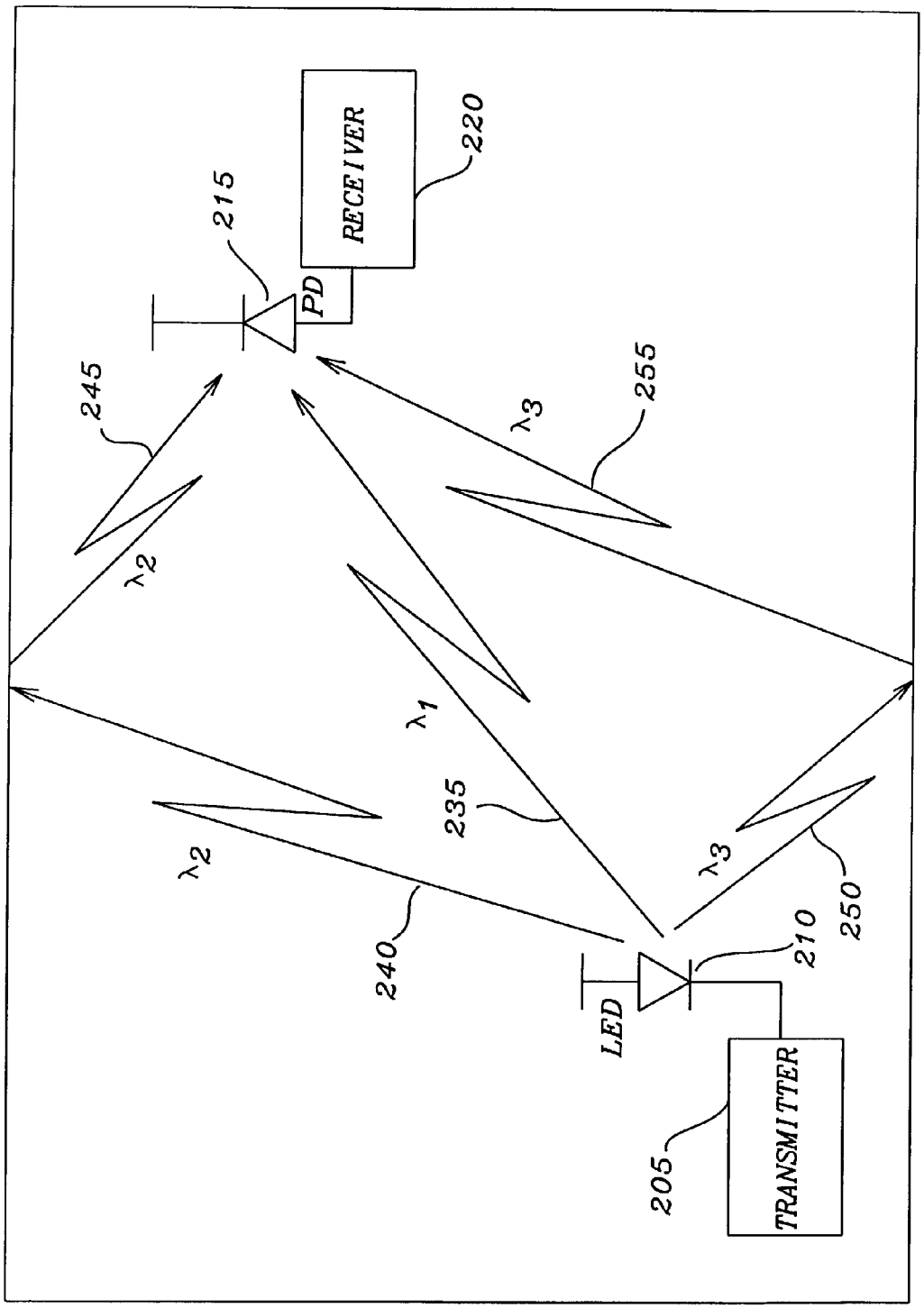
FIG. 3 is a diagram of the operation of a wireless infrared transmitter and receiver illustrating channel induced interference of the prior art.

The pulse width of each symbol digit of the pulse positioned modulated data is extended for at least a second symbol digit time slot $s_1$, $s_2$, $s_3$, or $s_4$. Thus the symbols SYM 2 and SYM 3 containing the symbols 10 and 00 are now merged to contain the symbol data (0011) (1100). If the reflected signals $\lambda_1$ and $\lambda_3$ of FIGS. 1 and 3 are delayed even longer, the symbol data could actually be (0011) (1110). The symbols SYM 4 and SYM 5 are similarly corrupted to become (0001) (1000). Thus the recoded data of SYM 5 is now interfered with from the previous symbol SYM 4.

Figure 7:
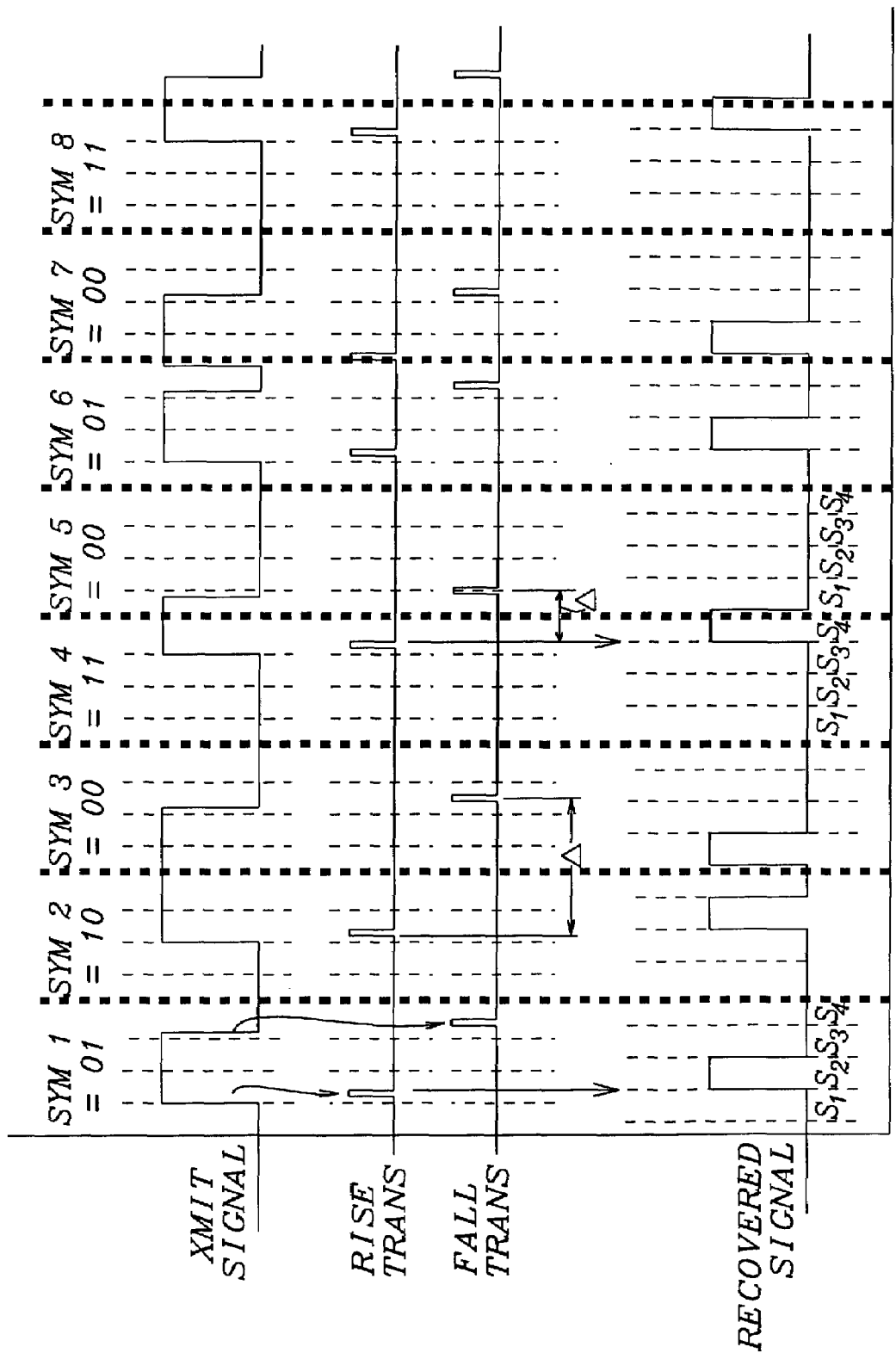
FIG. 7 is a plot illustrating the detection of state transitions of a received stream of pulse positioned modulated symbols and from the state transitions of the received pulse positioned modulated symbols recovering the transmitted pulse positioned modulated symbols in the presence of intersymbol interference of this invention.

The recovery of the received pulse positioned modulated signal is shown in FIG. 7. The rising transitions and the falling transitions of the received signal are recorded and the time difference τ from the rising transition and the falling transition is determined. If the time difference τ is less than a preset parameter, for instance the time of three symbol digits, the first symbol digit of the sequence of binary 1's is retained as the voltage level of the binary one and the remaining symbol digits are set to the voltage level of the binary zero. The symbols SYM 4 and SYM 5 illustrate this. The last symbol digit of symbol SYM 4 and the first symbol digit of the symbol SYM 5 have a voltage level of a binary one. The last symbol digit of symbol SYM 4 is retained at the voltage level of the binary one and the first symbol digit of the symbol SYM 5 is set to the voltage level of the binary zero. This retains the recoding described above.

Alternately, if the time difference τ is greater the preset parameter the first three symbol digits are set the voltage levels of the binary one, followed by the binary zero, followed by the binary one (101) and the remaining symbol digits of a symbol are set to the voltage level of the binary zero. The symbols SYM 2 and SYM 3 illustrate this recovery The last two symbol digits $s_3$ and $s_4$ of the symbol SYM 2 and the first two symbol digits $s_1$ and $s_2$ of the symbol SYM 5 all have the voltage level of the binary one. The time from the rising transition between the second and third symbol digits of the symbol SYM 2 and the falling transition between the third and fourth symbol digits of the symbol SYM 3 is greater than the preset parameter (duration of 3 symbol digits). The third symbol digit $s_3$ of the symbol SYM 2 and the first symbol digit $s_1$ of the symbol SYM 3 are retained at the voltage level of the binary one and the last symbol digit $s_4$ of the symbol SYM 2 is set to the voltage level of the binary zero. The remaining symbol digits ($s_3$ and $s_4$) of the symbol SYM 3 are set to the voltage level of the binary zero.

Figure 8:
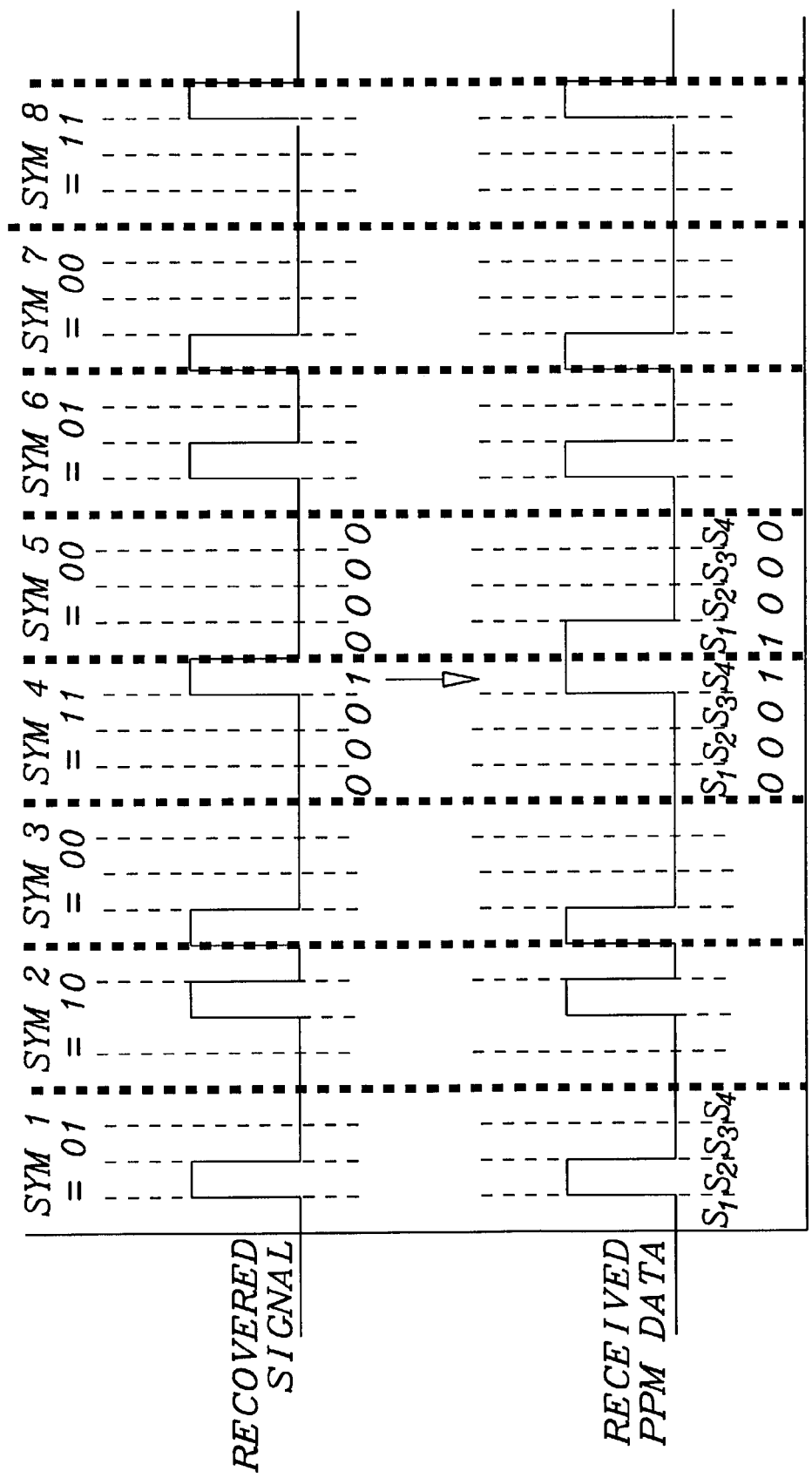
FIG. 8 is a plot illustrating the reconstruction of the pulse positioned modulated symbols from the received compensated symbol stream of this invention.

The recovered signal now reflects the transmitted signal of FIGS. 5 and 6. FIG. 8 illustrates the final decoding to recover the received version of the original pulse positioned modulated data. The recovered data is examined for the existence of a symbol code having a voltage level of a binary one at the fourth symbol digit $s_4$ and all the symbol digits $s_1$, $s_2$, $s_3$, and $s_4$ of the following symbol digit have a voltage level of a binary zero. The first symbol digit $s_1$ of the following symbol digit is set to the voltage level of a binary one Examining the symbols SYM 4 and SYM 5, the last symbol digit $s_4$ of the symbol SYM 4 is at the voltage level of a binary one and the symbol digits $s_1$, $s_2$, $s_3$, and $s_4$ of the symbol SYM 5 are at the voltage level of the binary zero. The first symbol digit $s_1$ of the symbol SYM 5 is set to the voltage level of the binary one and the symbol codes for symbols SYM 4 and SYM 5 are recovered as (11) (00).

Figure 9:
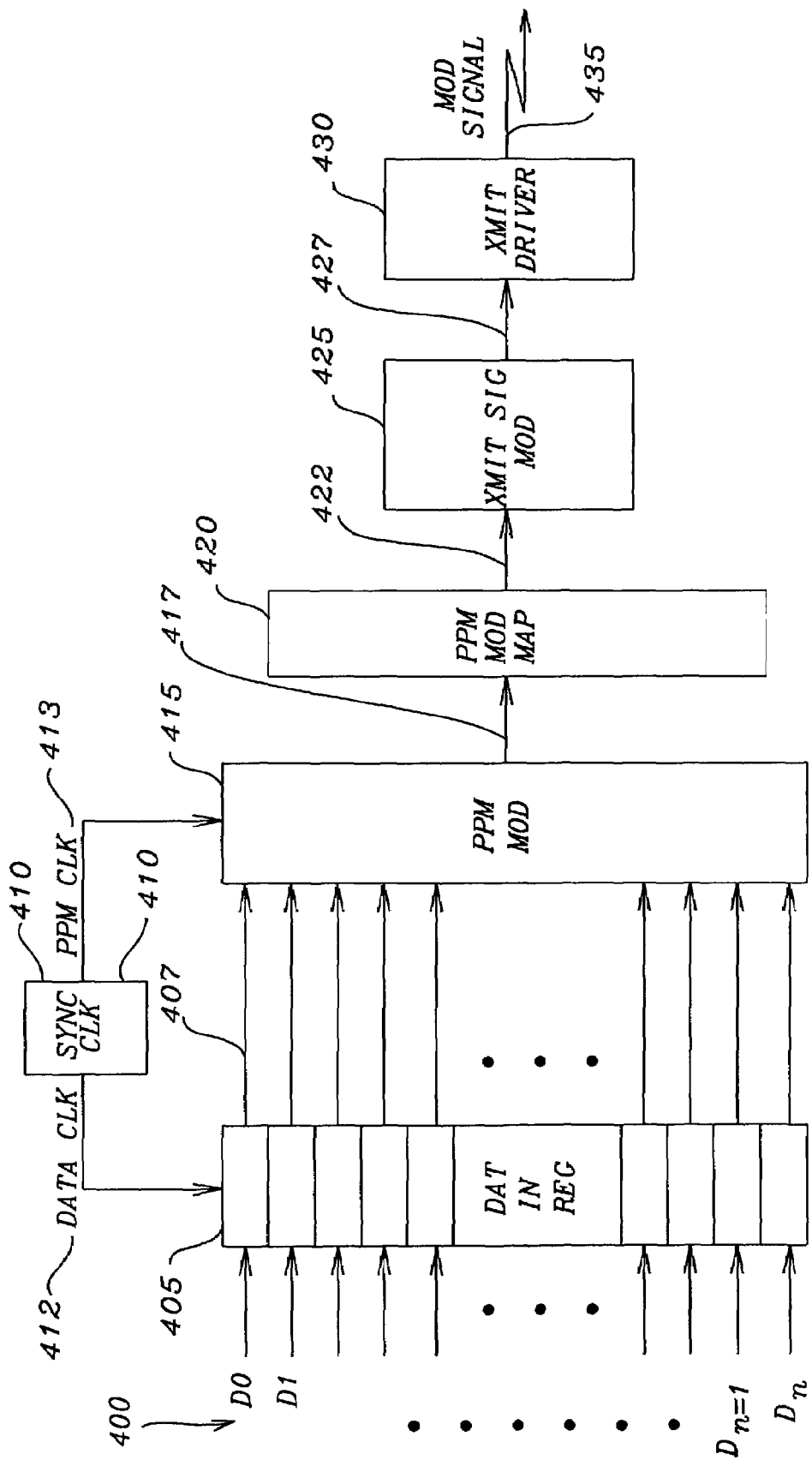
FIG. 9 is a block diagram of a transmitter of the communication system of this invention.
Figure 10:
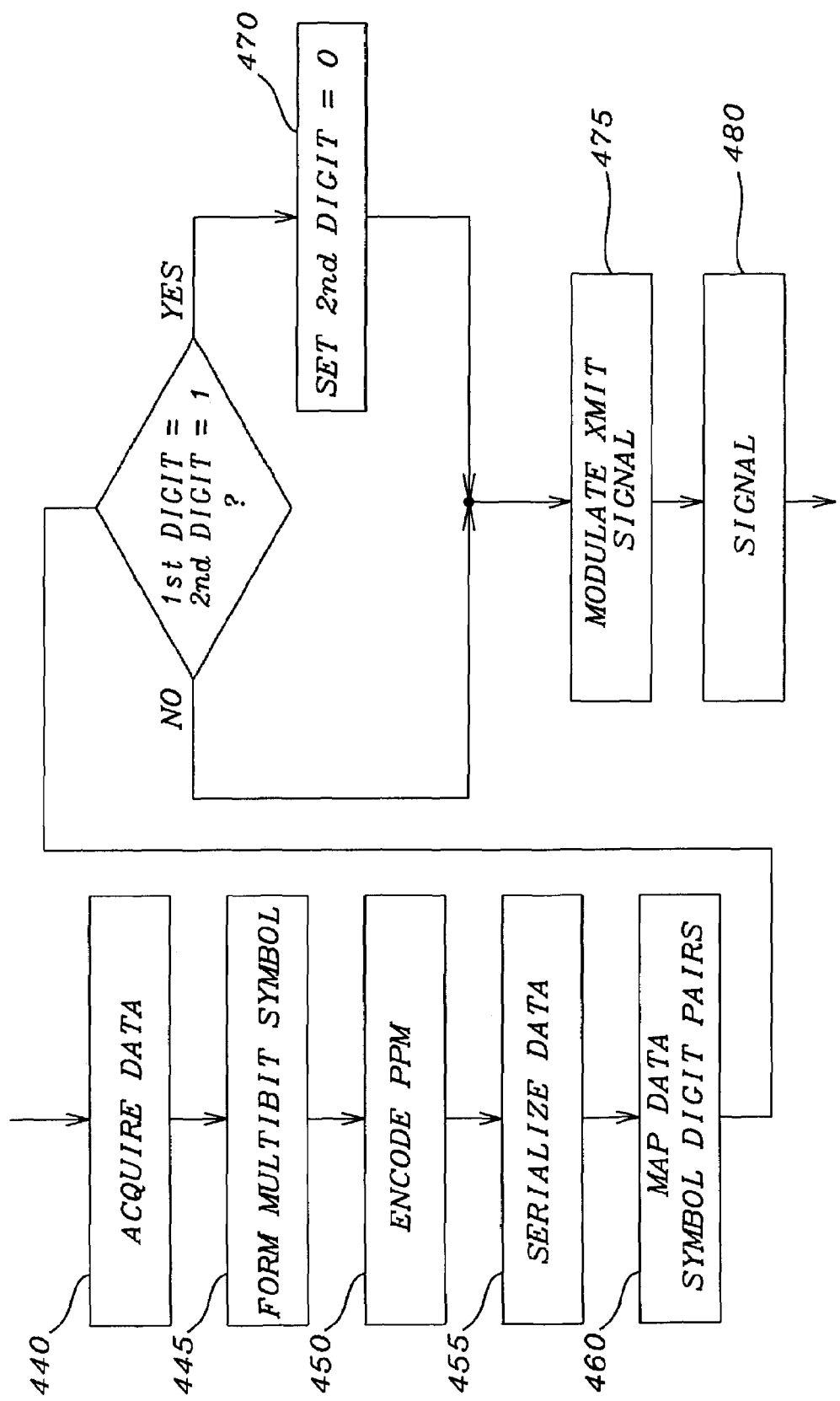
FIG. 10 is process flow diagram of the method for compensation of pulse positioned modulated signals of the transmitter of FIG. 9.
Figure 11:
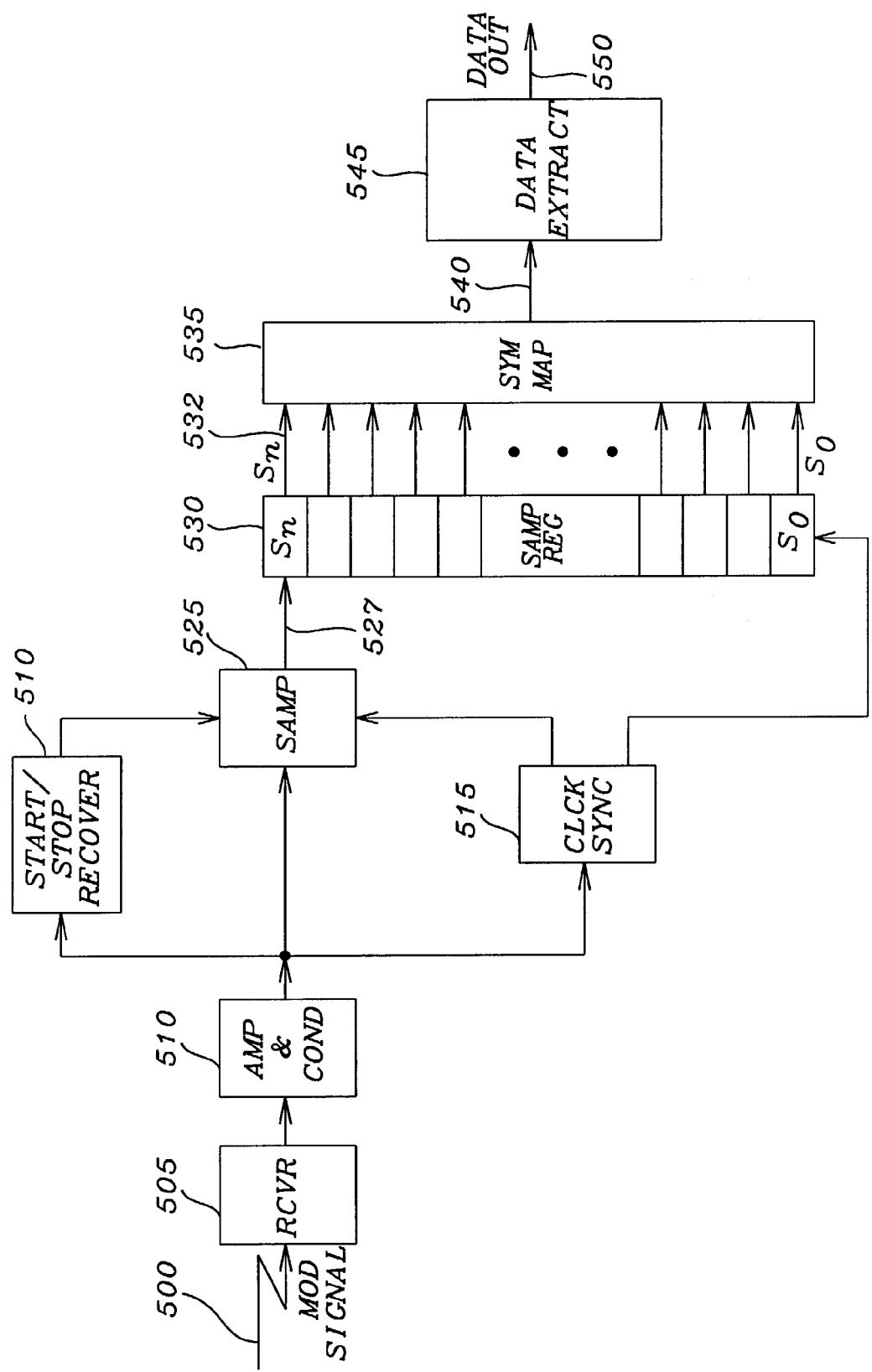
FIG. 11 is a block diagram of a receiver of the communication system of this invention.
Figure 12A:
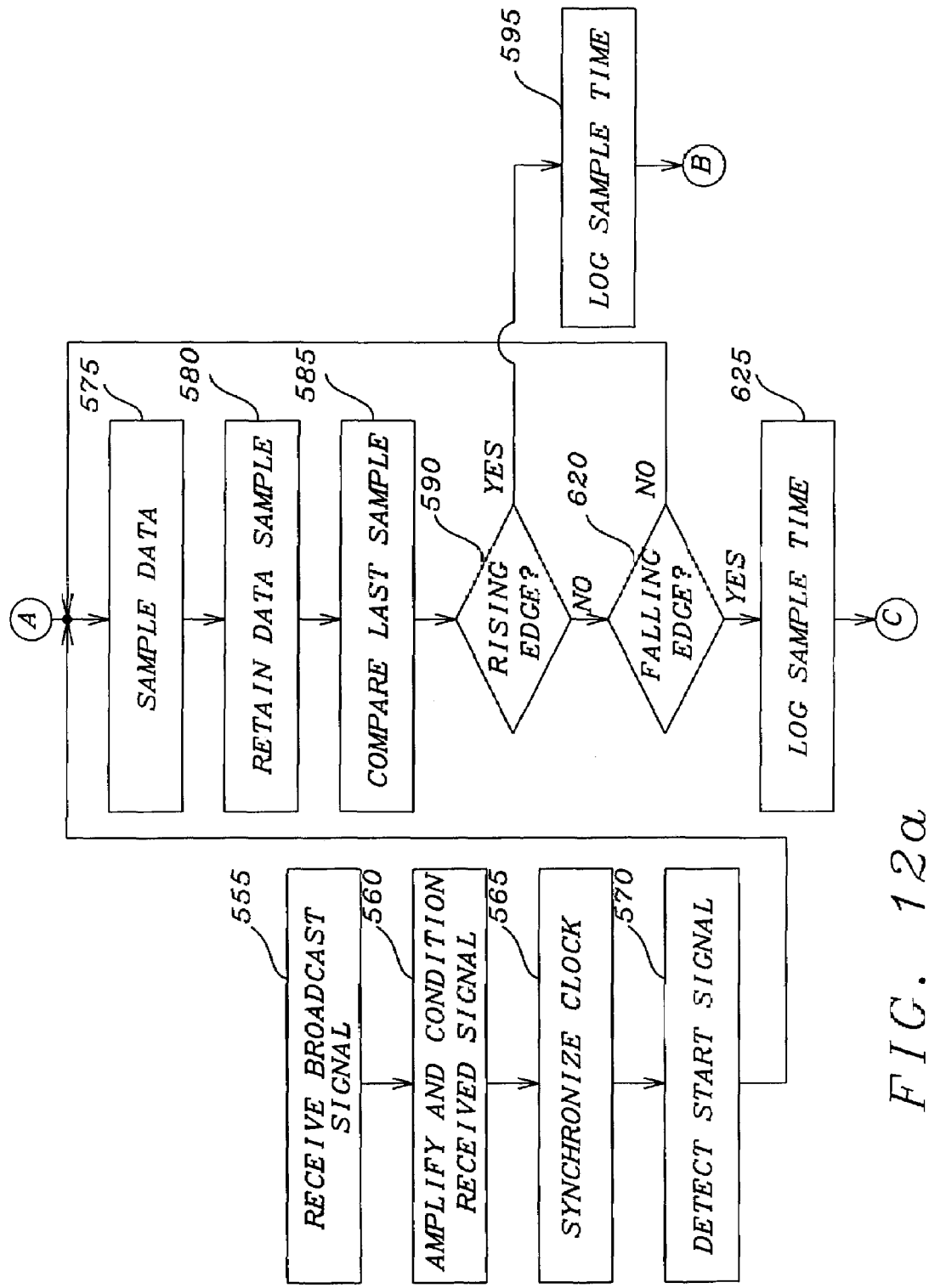
FIGS. 12a-12c is process flow diagram of the method of for recovery of pulse positioned modulated signals of the receiver of FIG. 11.
Figure 12B:
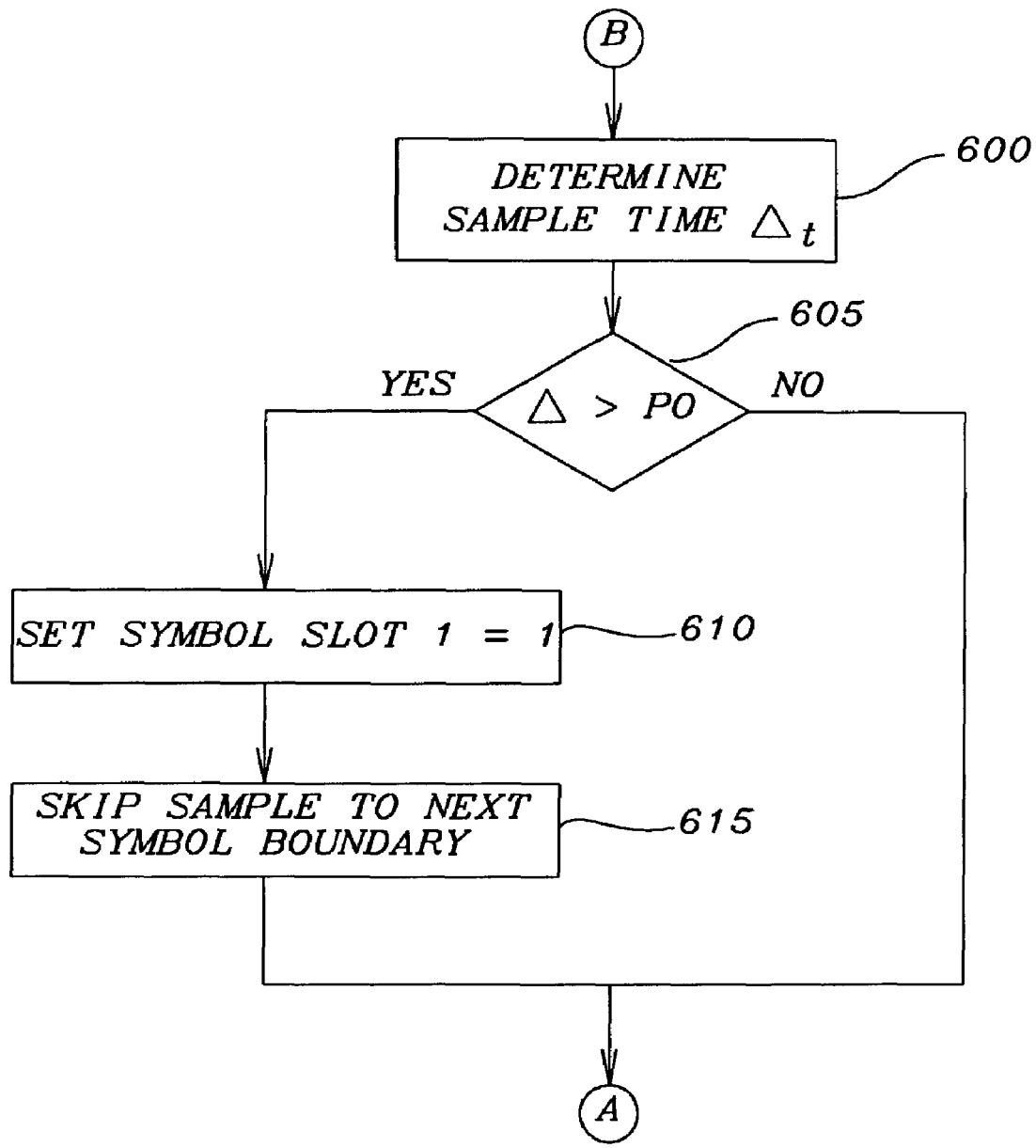
Figure 12C:
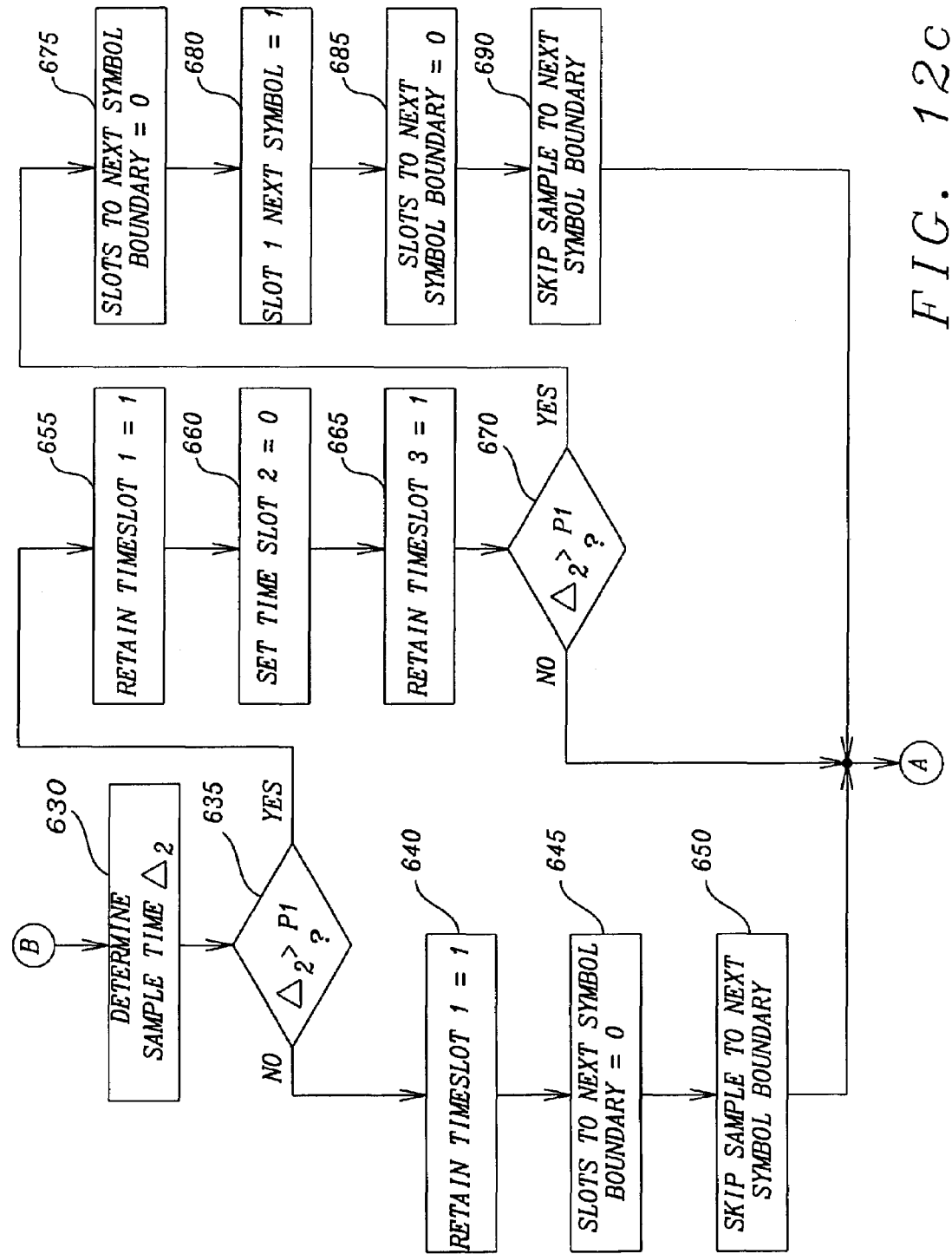

Refer now to FIGS. 9 and 10 for a description of the structure and operation of the transmission subsystem of a communication system of this invention. Digital data D0, . . . , Dn 400 is acquired (Box 440) by the data input register 405. In this illustration the digital data is originally parallel data such as would be created, transformed, and stored in a computing system The synchronizing clock circuit 410 provides the data clock 412 to gate the input digital data D0, . . . , Dn 400 to the data input register 405 at the data rate shown in FIG. 4. The data 407 retained by the data input register 405 is transferred to the pulse position modulator 415. The pulse positioned modulator 415 groups the data 407 to form (Box 445) multiple bit or binary digit symbols as shown in FIG. 4. For a four pulse positioned modulation, the data 407 is grouped into two bit or binary digital symbols. The synchronizing clock circuit 410 provides a pulse positioned clock 413 to the pulse positioned modulator 415 to determine the pulse positioned modulation encoding (Box 450) for each of the formed symbols. The pulse positioned clock 413 is equivalent to the pulse positioned modulation clock 305 of FIG. 4. The pulse positioned modulation encoded symbols are then transmitted serially (Box 455) as the pulse positioned modulated data 417 to the pulse positioned modulation mapping circuit 420. The pulse positioned modulation mapping circuit 420 compares adjacent symbol digits of the pulse positioned modulation data 417 to map (Box 460) the pulse positioned modulation data 417 to provide a compensation for the presence of channel induced intersymbol interference. When two adjacent symbol digits are compared (Box 465) and are both at a voltage level of the binary one, the pulse positioned modulation mapping circuit sets (Box 470) the second symbol digit of the pair or symbol digits to the voltage level of the binary zero. The mapping of the pulse positioned modulated data 417 is equivalent to the method described in FIG. 5 where a data symbol (11) is adjacent to a data symbol (00). The pulse positioned modulation mapping circuit 420 has formed the transmission signal 422, which is transferred to the transmission signal modulation circuit 425. The transmission signal modulation circuit 425 modulates (Box 475) a signal 427 that is to be transmitted, either Frequency Shift Keying an RF Signal or gating a light signal. The modulated signal 427 is the input signal to the transmission driver that excites a transducer such as the transmission antenna 15 of FIG. 1 or the LED 210 of FIG. 3. The modulated signal 435 is then broadcast (Box 480) through the transmission medium.

An illustration of the structure and operation of the receiving subsystem of the communication system of this invention is shown in FIGS. 11 and 12a-12c. The modulated signal 500 is acquired (Box 555) by a receiver 505 either through the antenna 20 of FIG. 1 or the LED 210 of FIG. 2. The amplifier and conditioning circuit 510 amplifies, demodulates, and conditions (Box 560) the received signal 500 to create the received pulse positioned modulated data 512. Generally, the transmitter of FIG. 9 will have embedded a synchronization signal and a start and/or stop signal within the transmitted signal. The synchronization signal is detected by the clock synchronization circuit 515 and the clock synchronization circuit 515 generates (Box 565) a receiver system clock that is aligned to the embedded synchronization signal. The start signal indicates the beginning of the transmitted data follows immediately upon completion of the start signal. The stop signal indicates the completion of the data message and any following detected data signal is not part of the transmitted message. The start/stop recovery circuit detects the presence of the start and/or stop signals within the received pulse positioned modulated signal.

Upon detection (Box 570) of the start signal, the received pulse positioned modulated data is sampled (Box 575) by the data sampling circuit 525. The clock synchronizing circuit 515 provides a sampling dock to provide at least one sample during a symbol digit $s_1$, $s_2$, $s_3$, and $s_4$ time to determine the voltage level of the binary digit being sampled. The sampled pulse positioned modulated data 527 is transferred to the sample register 530 where is it retained (Box 580) for extraction of the transmitted pulse position modulated data that is corrupted by intersymbol interference. The retained samples are transferred to the sample mapping circuit 540, which performs the extraction of the transmitted pulse positioned modulated data.

The current sample for a symbol digit is compared (Box 585) to a previous sample of a symbol digit. If the previous symbol digit is at the first voltage level indicating a binary zero and the current symbol digit is a the second voltage level indicating a binary one, a rising edge has occurred (Box 590). If the rising edge has not occurred, but the comparison indicates that the previous symbol digit has the second voltage level indicating a binary one and the current symbol digit has the first voltage level indicating a binary zero, then a falling edge has occurred (Box 620). However, if the previous and the current symbol digits are equal (either the first level indicating a binary zero or the second level indicating a binary one), then no transition has occurred and the next sample is taken (Box 575) and retained (Box 580) for comparison (Box 585) with the now previous sample.

When a rising edge occurs (Box 590), the sample time at which the rising edge occurs is recorded (Box 595). The difference time $\Delta_1$ between the recorded time for the rising edge and a previous falling edge is determined (Box 600). Upon comparison (Box 605) with a preset time P0 for instance 3×τs (τs being the time duration of a symbol digit) if the difference time $\Delta_1$ is not greater than the preset time P0, the next sample is taken (Box 575) and retained (Box 580) for comparison (Box 585) with the now previous sample.

When a falling edge occurs (Box 620), The sample time at which the falling edge occurs is recorded (Box 625). The difference time $\Delta_2$ between the logged time of the rising edge and the logged time of the falling edge is calculated (Box 630). The difference time $\Delta_2$ is compared (Box 635) to a preset time P1 (for instance 3×τs). If the difference time $\Delta_2$ is less than the preset time P1, the symbol digit at the rising edge having the voltage level of the binary one is retained (Box 640) at the binary one and all symbol digits remaining in the symbol up to the falling edge are set (Box 645) to the voltage level of the binary zero. This provides the recovery of the symbol digits as discussed above for SYM 4 and SYM 5 of FIG. 7.

If the difference time $\Delta_2$ is greater than the preset time P1, the symbol digit (Slot 1) at the rising edge having the voltage level of the binary one is retained (Box 655) at the binary one. The adjacent symbol digit (Slot 2) is set (Box 660) to the voltage level of the binary zero and the next adjacent symbol digit (Slot 3) is retained (Box 665) at the voltage level of the binary one. This provides the recovery of the symbol digits as discussed above for SYM 2 and SYM 3 as discussed in FIG. 7.

The difference time $\Delta_2$ is then compared (Box 670) to an even longer preset time P2 (for instance 5×τs). If the difference time $\Delta_2$ is greater the longer preset time P2, the final slot next to a symbol boundary is set (Box 675) to the voltage level of the binary zero. The first symbol digit (Slot 1) of the following symbol is retained (Box 680) at the voltage level of the binary one and all remaining slots of the symbol should be set (Box 685) to a binary zero. The sampling is skipped to the next symbol boundary (Box 690). The longer preset time P2 allows for the recovery of a set of symbol digits having a coding of (101001) from a received corrupted pulse position modulated data of (11111111). The worst incidence of this occurring would permit the reception of the received pulse position modulated data (0001) (1111) (1110) and then recovery of the transmitted (0001) (0100) (1000).

Upon completion of the recovery of the transmitted pulse positioned modulated data, the next sample is taken (Box 575) and retained (Box 580) for comparison (Box 585) with the now previous sample. If a rising edge is determined (Box 590), the time of the rising edge is recorded (Box 595). The difference time $\Delta_1$ between the previous falling edge and the present rising edge is determined (Box 600). The difference time $\Delta_1$ is compared (Box 605) to the preset time 3×τs and if the difference time $\Delta_1$ is greater than the preset time 3×τs, the first symbol digit (Slot 1) of the symbol subsequent to the falling edge is set (Box 610) to the voltage level of the binary one. The remaining symbol digits are retained at the voltage level of the binary zero and the sampling skips (Box 615) to the next symbol boundary. The sampling and recovery process then continues until the message is complete with the reception of a stop signal or synchronization signal.

Returning to FIG. 11, the pulse position modulated data 540 recovered by the symbol mapping circuit 535 is transferred to the data extraction circuit 545. The data extraction circuit 545 decodes the pulse position modulated data to extract the data symbols and assemble the data symbols to the originally encoded data.

The symbol mapping circuit 535 and the data extraction circuit 545 are in the preferred embodiment logical state machines capable of extremely high speed recovery of the data symbols and extraction of the data. However, it is known in the art that the structure and method described above may be accomplished within a digital signal processor or similar computing system with the functions and processes being programs stored on data storage medium for execution by the processes.

Further, the preferred embodiment illustrates a four pulse positioned modulated data signal. It is in keeping with the intent of this invention that any number of pulse position modulated symbol digits may be employed to encode the digital data. The structure and method of the communications system of this invention functions with a higher order pulse position modulated encoding.

The communications systems as shown in FIGS. 1 and 3 illustrate wireless transmission of the broadcast modulated signal. It is keeping with the intention of this invention that the modulated signal be transmitted within a cable, either an electrical signal in a copper cabling or a light signal within a fiber optic cable.

While this invention has been particularly shown and described with reference to the preferred embodiments thereof, it will be understood by those skilled in the art that various changes in form and details may be made without departing from the spirit and scope of the invention.

The invention claimed is:

1. A communication system for the transmission and recovery of data symbols a presence of channel induced intersymbol interference, said communication system comprising:
   a transmitter for transmitting a signal containing said data symbols comprising:
      a modulation apparatus connected to receive data and convert said data to data symbols, said data symbols encoded to compensate for the channel induced intersymbol interference, said modulation apparatus comprising:
      a symbol mapping circuit which receives data symbols to be transmitted and maps said data symbols to a transmission code, said symbol mapping circuit comprising:
         a) means for comparing two adjacent data symbol digits,
         b) means for transmitting said data symbol digits, if said two adjacent data symbol digits have a first data level,
         c) means for transmitting said data symbols, if said data symbol digits have the first data level and a second data level, and
         d) means for converting a second of said two adjacent data symbol digits to the first data level and transmitting said second data symbol digits, if said data symbol digits have the second data level, transmitting a first of said two adjacent data symbol digits; and
   a receiver for acquiring said signal containing said data symbols, recovering said data symbols, and extracting said data, said receiver comprising:
      a demodulation apparatus within a receiving system to recover data symbols in the presence of channel induced intersymbol interference comprising:
      a sampling circuit in communication with a receiving circuit within said receiving system to sample at a regular period received data symbols acquired by said receiving circuit,
      a sample retaining circuit in communication with the sampling circuit to store samples of the data symbols, and
      a symbol mapping circuit in communication with the sample retaining circuit for receiving said samples of the data symbols and comprising means for recovering said data symbols, said means for recovering said data symbols comprising:
         a) means for determining from two adjacent data symbol digits if a first state transition is present in said data symbol digits, said first state transition indicating that a first of the two adjacent data symbol digits is at the first data level and a second of the two adjacent data symbol digits is the second data level,
         b) means for recording a first state transition time, if the first state transition is present,
         c) means for repeatedly activating means for determining from two adjacent data symbol digits if a first state transition is present in said data symbol digits until said first state transition is present, if the first state transition is not present,
         d) means for determining is a second state transition is present in said data symbol digits, said second state transition indicating that a first of the two adjacent data symbol digits is at the second data level and the first of the two adjacent data symbol digits is the second data level, when said first state transition is determined,
         e) means for recording a second state transition time, if the second state transition is present,
         f) means for determining a time difference between the first state transition time and the second state transition time,
         g) means for setting at least one of any data symbol digits received subsequently to the second data symbol digit of the two adjacent symbol digits having the first state transitions to the first data level, if the time difference is less than a boundary time, and
         h) means for setting a first data symbol digit received subsequently to the second data symbol digit of the two adjacent symbol digits having the first state transition to the first data level and a second data symbol digit to the second data level, if the time difference is greater than the boundary time.

2. The communication system of claim 1 wherein the means for recovering said data symbols further comprises:
   means for setting all data symbol digits received after the second data symbol digits subsequent to the second data symbol digit of the two adjacent symbol digits having the first state transition and prior to a data symbol boundary to the first data level; and
   means for setting a data symbol digit arriving subsequent to said data symbol boundary to the second data level and all remaining symbol digits of one data symbol subsequent to said data symbol boundary to the first data level.

3. The communication system of claim 1 wherein the means for recovering said data symbols further comprises:
   means for determining if a last data symbol digit of a symbol is at the second data level;
   means for determining if all symbol digits of a following data symbol are at the first data level if said last data symbol digit is at the second data level; and
   means for setting the first symbol digit of the following data symbol to the second data level if all the data symbol digits of the following data symbol are at the first data level.

4. A modulation apparatus within a transmission system to compensate for channel induced intersymbol interference causing corruption of data symbols during broadcast of said data symbols from said transmission system, said modulation apparatus comprising:
   a symbol mapping circuit which receives data symbols to be transmitted and maps said data symbols to a transmission code, said symbol mapping circuit comprising:
      a) means for comparing two adjacent data symbol digits,
      b) means for transmitting said data symbol digits, if said two adjacent data symbol digits have a first data level,
      c) means for transmitting said data symbols, if said data symbol digits have the first data level and a second data level, and
      d) means for converting a second of said two adjacent data symbol digits to the first data level and transmitting said second data symbol digits, if said data symbol digits have the second data level, transmitting a first of said two adjacent data symbol digits.

5. A demodulation apparatus within a receiving system to recover data symbols in the presence of channel induced intersymbol interference comprising:
   a sampling circuit in communication with a receiving circuit within said receiving system to sample at a regular period received data symbols acquired by said receiving circuit;
   a sample retaining circuit in communication with the sampling circuit to store samples of the data symbols; and
   a symbol mapping circuit in communication with the sample retaining circuit for receiving said samples of the data symbols and comprising means for recovering said data symbols, said means for recovering said data symbols comprising the steps of:
      a) means for determining from two adjacent data symbol digits if a first state transition is present in said data symbols, said first state transition indicating that a first of the two adjacent data symbol digits is at the first data level and a second of the two adjacent data symbol digits is the second data level,
      b) means for recording a first state transition time, if the first state transition is present,
      c) means for repeatedly activating means for determining from two adjacent data symbol digits, if the first state transition is not present until said first state transition is present,
      d) means for determining is a second state transition is present in said data symbols, said second state transition indicating that a first of the two adjacent data symbol digits is at the second data level and the first of the two adjacent data symbol digits is the second data level, when said first state transition is determined,
      e) means for recording a second state transition time, if the second state transition is present,
      f) means for determining a time difference between the first state transition time and the second state transition time,
      g) means for setting at least one of any data symbol digits received subsequently to the second data symbol digit of the two adjacent symbol digits having the first state transitions to the first data level, if the time difference is less than a boundary time, and
      h) means for setting a first data symbol digit received subsequently to the second data symbol digit of the two adjacent symbol digits having the first state transition to the first data level and a second data symbol digit to the second data level, if the time difference is greater than the boundary time.

6. The demodulation apparatus of claim 5 wherein the means for recovering said data symbols further comprises the steps of:
   means for setting all data symbol digits received after the second data symbol digits subsequent to the second data symbol digit of the two adjacent symbol digits having the first state transition and prior to a data symbol boundary to the first data level; and
   means for setting a data symbol digit arriving subsequent to said data symbol boundary to the second data level and all remaining symbol digits of one data symbol subsequent to said data symbol boundary to the first data level.

7. The demodulation apparatus of claim 5 wherein the means for recovering said data symbols further comprises:
   means for determining if a last data symbol digit of a symbol is at the second data level;
   means for determining if all symbol digits of a following data symbol are at the first data level, if said last data symbol digit is at the second data level; and
   means for setting the first symbol digit of the following data symbol to the second data level, if all the data symbol digits of the following data symbol are at the first data level.

8. A method for communication of digital data in a presence of channel induced intersymbol interference, said method for communication comprising the steps of:
   partitioning said digital data into data symbols;
   encoding said data symbols to a pulse positioned coding, a position of a pulse within a symbol time determining a code for each symbol value;
   compensating for the channel induced intersymbol interference, said compensating comprising the steps of:
      mapping said pulse positioned coding to a transmission code by the steps of:
         comparing two adjacent data symbol digits of said pulse positioned coding, and
         if said adjacent data symbol digits have a second data level, keeping a first of said two adjacent data symbol digits at the second data level, and converting a second of said two adjacent data symbol digits to a first data level;
   modulating a transmission signal with said transmission code;
   transmitting said transmission signal;
   receiving said transmission signal;
   demodulating said transmission signal to extract a corrupted transmission code, said corrupted transmission code being the transmission code as degraded by the channel induced intersymbol interference;
   sampling at a regular period the corrupted transmission code;
   retaining the samples of the corrupted transmission code; and
   recovering said pulse positioned coding, said recovering said pulse positioned coding comprising the steps of:
      a) determining from two adjacent data symbol digits if a first state transition is present in said data symbol digits, said first state transition indicating that a first of the two adjacent data symbol digits is at the first data level and a second of the two adjacent data symbol digits is the second data level,
      b) if the first state transition is present, recording a first state transition time,
      c) if the first state transition is not present repeating step a) until said first state transition is present,
      d) when said first state transition is determined, determining that a second state transition is present in said corrupted transmission coding, said second state transition indicating that a first of the two adjacent data symbol digits is at the second data level and the second of the two adjacent data symbol digits is at the first data level,
      e) if the second state transition is present, recording a second state transition time,
      f) determining a time difference between the first state transition time and the second state transition time,
      g) if the time difference is less than a boundary time, setting at least one of any data symbol digits received subsequently to the second data symbol digit of the two adjacent symbol digits having the first state transitions to the first data level, and h) if the time difference is greater than the boundary time, setting a first data symbol digit received subsequently to the second data symbol digit of the two adjacent symbol digits having the first state transition to the first data level and a second data symbol digit to the second data level.

9. The method of communication of claim 8 wherein said recovering said pulse position coding further comprises the steps of:
setting all data symbol digits received after the second data symbol digits subsequent to the second data symbol digit of the two adjacent symbol digits having the first state transition and prior to a data symbol boundary to the first data level; and
setting a data symbol digit arriving subsequent to said data symbol boundary to the second data level and all remaining symbol digits of one data symbol subsequent to said data symbol boundary to the first data level.

10. The method of communication of claim 8 wherein the method for recovering said data symbols further comprises the steps of,
determining if a last data symbol digit of a symbol is at the second data level;
if said last data symbol digit is at the second data level, determining if all symbol digits of a following data symbol are at the first data level; and
if all the data symbol digits of the following data symbol are at the first data level, setting the first symbol digit of the following data symbol to the second data level.

11. A method for transmission of digital data in a presence of channel induced intersymbol interference, said method for transmission comprising the steps of:
partitioning said digital data into data symbols;
encoding said data symbols to a pulse positioned coding, a position of a pulse within a symbol time determining a code for each symbol value;
compensating for the channel induced intersymbol interference, said compensating comprising the steps of:
mapping said pulse positioned coding to a transmission code by the steps of:
comparing two adjacent data symbol digits of said pulse positioned coding, and
if said data symbol digits have a second data level, keeping a first of said two adjacent data symbol digits at the second data level, and converting a second of said two adjacent data symbol digits to a first data level;
modulating a transmission signal with said transmission code;
transmitting said transmission signal.

12. A method for reception of digital data in a presence of channel induced intersymbol interference, said method for communication comprising the steps of:
receiving a transmission signal having a corrupted transmission code, said corrupted transmission code including a pulse positioned modulated transmission code degraded by said channel induced intersymbol interference;
demodulating said transmission signal to extract a corrupted transmission code;
sampling at a regular period the corrupted transmission code;
retaining the samples of the corrupted transmission code; and
recovering said pulse positioned coding, said recovering said pulse positioned coding comprising the steps of:

a) determining from two adjacent data symbol digits if a first state transition is present in said data symbol digits, said first state transition indicating that a first of the two adjacent data symbol digits is at the first data level and a second of the two adjacent data symbol digits is at the second data level,
b) if the first state transition is present, recording a first state transition time,
c) if the first state transition is not present repeating step a) until said first state transition is present,
d) when said first state transition is determined, determining that a second state transition is present in said corrupted transmission coding, said second state transition indicating that a first of the two adjacent data symbol digits is at the second data level and the second of the two adjacent data symbol digits is set at the first data level,
e) if the second state transition is present, recording a second state transition time,
f) determining a time difference between the first state transition time and the second state transition time,
g) if the time difference is less than a boundary time, setting at least one of any data symbol digits received subsequently to the second data symbol digit of the two adjacent symbol digits having the first state transitions to the first data level, and
h) if the time difference is greater than the boundary time, setting a first data symbol digit received subsequently to the second data symbol digit of the two adjacent symbol digits having the first state transition to the first data level and a second data symbol digit to the second data level.

13. The method of reception of claim 12 wherein said recovering said pulse position coding further comprises the steps of:
setting all data symbol digits received after the second data symbol digits subsequent to the second data symbol digit of the two adjacent symbol digits having the first state transition and prior to a data symbol boundary to the first data level; and
setting a data symbol digit arriving subsequent to said data symbol boundary to the second data level and all remaining symbol digits of one data symbol subsequent to said data symbol boundary to the first data level.

14. The method of reception of claim 12 wherein said recovering said data symbols further comprises the steps of,
determining if a last data symbol digit of a symbol is at the second data level;
if said last data symbol digit is at the second data level, determining if all symbol digits of a following data symbol are at the first data level; and
if all the data symbol digits of the following data symbol are at the first data level, setting the first symbol digit of the following data symbol to the second data level.

15. The method of reception of claim 12 wherein the pulse positioned modulated transmission code is created by the steps of:
partitioning said digital data into data symbols;
encoding said data symbols to a pulse positioned coding, a position of a pulse within a symbol time determining a code for each symbol value;
compensating for the channel induced intersymbol interference, said compensating comprising the steps of:
mapping said pulse positioned coding to a transmission code by the steps of:
comparing two adjacent data symbol digits of said pulse positioned coding, and if said data symbol digits have a second data level, keeping a first of said two adjacent data symbol digits at the second data level, and converting a second of said two adjacent data symbol digits to the first data level.

16. A program retention device containing program instruction code executable on at least one computing device for transmitting and for receiving a digital data communication signal in the presence of channel induced intersymbol interference, said program instruction code comprising the steps of:
  partitioning said digital data into data symbols;
  encoding said data symbols to a pulse positioned coding, a position of a pulse within a symbol time determining a code for each symbol value;
  compensating for the channel induced intersymbol interference, said compensating comprising the steps of:
    mapping said pulse positioned coding to a transmission code by the steps of:
      comparing two adjacent data symbol digits of said pulse positioned coding, and
      if said adjacent data symbol digits have a second data level, keeping a first of said two adjacent data symbol digits at the second data level, and converting a second of said two adjacent data symbol digits to a first data level;
  modulating a transmission signal with said transmission code;
  transmitting said transmission signal;
  receiving said transmission signal;
  demodulating said transmission signal to extract a corrupted transmission code, said corrupted transmission code being the transmission code as degraded by the channel induced intersymbol interference;
  sampling at a regular period the corrupted transmission code;
  retaining the samples of the corrupted transmission code; and
  recovering said pulse positioned coding, said recovering said pulse positioned coding comprising the steps of:
    a) determining from two adjacent data symbol digits if a first state transition is present in said data symbol digits, said first state transition indicating that a first of the two adjacent data symbol digits is at the first data level and a second of the two adjacent data symbol digits is the second data level,
    b) if the first state transition is present, recording a first state transition time,
    c) if the first state transition is not present repeating step a) until said first state transition is present,
    d) when said first state transition is determined, determining that a second state transition is present in said corrupted transmission coding, said second state transition indicating that a first of the two adjacent data symbol digits is at the second data level and the second of the two adjacent data symbol digits is at the first data level,
    e) if the second state transition is present, recording a second state transition time,
    f) determining a time difference between the first state transition time and the second state transition time,
    g) if the time difference is less than a boundary time, setting at least one of any data symbol digits received subsequently to the second data symbol digit of the two adjacent symbol digits having the first state transitions to the first data level, and
    h) if the time difference is greater than the boundary time, setting a first data symbol digit received subsequently to the second data symbol digit of the two adjacent symbol digits having the first state transition to the first data level and a second data symbol digit to the second data level.

17. The program retention device of claim 16 wherein said recovering said pulse position coding further comprises the steps of:
  setting all data symbol digits received after the second data symbol digits subsequent to the second data symbol digit of the two adjacent symbol digits having the first state transition and prior to a data symbol boundary to the first data level; and
  setting a data symbol digit arriving subsequent to said data symbol boundary to the second data level and all remaining symbol digits of one data symbol subsequent to said data symbol boundary to the first data level.

18. The program retention device of claim 16 wherein the method for recovering said data symbols further comprises the steps of:
  determining if a last data symbol digit of a symbol is at the second data level;
  if said last data symbol digit is at the second data level, determining if all symbol digits of a following data symbol are at the first data level; and
  if all the data symbol digits of the following data symbol are at the first data level, setting the first symbol digit of the following data symbol to the second data level.

19. A program retention device containing program instruction code executable on at least one computing device for transmitting a digital data communication signal in the presence of channel induced intersymbol interference, said program instruction code comprising the steps of:
  partitioning said digital data into data symbols;
  encoding said data symbols to a pulse positioned coding, a position of a pulse within a symbol time determining a code for each symbol value;
  compensating for the channel induced intersymbol interference, said compensating comprising the steps of:
    mapping said pulse positioned coding to a transmission code by the steps of:
      comparing two adjacent data symbol digits of said pulse positioned coding, and
      if said data symbol digits have a second data level, keeping a first of said two adjacent data symbol digits at the second data level, and converting a second of said two adjacent data symbol digits to a first data level;
  modulating a transmission signal with said transmission code;
  transmitting said transmission signal.

20. A program retention device containing program instruction code executable on at least one computing device for receiving a digital data communication signal in the presence of channel induced intersymbol interference, said program instruction code comprising the steps of:
  receiving a transmission signal having a corrupted transmission code, said corrupted transmission code including a pulse positioned modulated transmission code degraded by said channel induced intersymbol interference;
  demodulating said transmission signal to extract a corrupted transmission code;
  sampling at a regular period the corrupted transmission code;

retaining the samples of the corrupted transmission code; and recovering said pulse positioned coding, said recovering said pulse positioned coding comprising the steps of:
- a) determining from two adjacent data symbol digits if a first state transition is present in said data symbol digits, said first state transition indicating that a first of the two adjacent data symbol digits is at the first data level and a second of the two adjacent data symbol digits is at the second data level,
- b) if the first state transition is present, recording a first state transition time,
- c) if the first state transition is not present repeating step a) until said first state transition is present,
- d) when said first state transition is determined, determining that a second state transition is present in said corrupted transmission coding, said second state transition indicating that a first of the two adjacent data symbol digits is at the second data level and the second of the two adjacent data symbol digits is set at the first data level,
- e) if the second state transition is present, recording a second state transition time,
- f) determining a time difference between the first state transition time and the second state transition time,
- g) if the time difference is less than a boundary time, setting at least one of any data symbol digits received subsequently to the second data symbol digit of the two adjacent symbol digits having the first state transitions to the first data level, and
- h) if the time difference is greater than the boundary time, setting a first data symbol digit received subsequently to the second data symbol digit of the two adjacent symbol digits having the first state transition to the first data level and a second data symbol digit to the second data level.

21. The program retention device of claim 20 wherein said recovering said pulse position coding further comprises the steps of:

setting all data symbol digits received after the second data symbol digits subsequent to the second data symbol digit of the two adjacent symbol digits having the first state transition and prior to a data symbol boundary to the first data level; and setting a data symbol digit arriving subsequent to said data symbol boundary to the second data level and all remaining symbol digits of one data symbol subsequent to said data symbol boundary to the first data level.

22. The program retention device of claim 20 wherein said recovering said data symbols further comprises the steps of, determining if a last data symbol digit of a symbol is at the second data level;

if said last data symbol digit is at the second data level, determining if all symbol digits of a following data symbol are at the first data level; and if all the data symbol digits of the following data symbol are at the first data level, setting the first symbol digit of the following data symbol to the second data level.

23. The program retention device of claim 20 wherein the pulse positioned modulated transmission code is created by the steps of:

partitioning said digital data into data symbols;

encoding said data symbols to a pulse positioned coding, a position of a pulse within a symbol time determining a code for each symbol value;

compensating for the channel induced intersymbol interference, said compensating comprising the steps of:

mapping said pulse positioned coding to a transmission code by the steps of:

comparing two adjacent data symbol digits of said pulse positioned coding, and if said data symbol digits have a second data level, keeping a first of said two adjacent data symbol digits at the second data level, and converting a second of said two adjacent data symbol digits to the first data level.

* * * * *